April 28, 1936. B. L. QUARNSTROM 2,038,600
METHOD AND APPARATUS FOR MAKING TUBING
Filed Feb. 19, 1932 4 Sheets-Sheet 1

INVENTOR
Bert L. Quarnstrom
BY
Barnes, Kisselle & Laughlin
ATTORNEYS

April 28, 1936.   B. L. QUARNSTROM   2,038,600
METHOD AND APPARATUS FOR MAKING TUBING
Filed Feb. 19, 1932   4 Sheets-Sheet 2

INVENTOR
Bert L. Quarnstrom
BY
Barnes, Kisselle & Laughlin
ATTORNEYS

April 28, 1936. B. L. QUARNSTROM 2,038,600
METHOD AND APPARATUS FOR MAKING TUBING
Filed Feb. 19, 1932  4 Sheets-Sheet 3

INVENTOR
Bert L. Quarnstrom
BY
Barnes, Kisselle & Laughlin
ATTORNEYS

April 28, 1936.   B. L. QUARNSTROM   2,038,600
METHOD AND APPARATUS FOR MAKING TUBING
Filed Feb. 19, 1932    4 Sheets-Sheet 4

INVENTOR
Bert L. Quarnstrom
BY
Barnes, Kisselle & Laughlin
ATTORNEYS

Patented Apr. 28, 1936

2,038,600

UNITED STATES PATENT OFFICE 2,038,600

METHOD AND APPARATUS FOR MAKING TUBING

Bert L. Quarnstrom, Detroit, Mich., assignor to Bundy Tubing Company, Detroit, Mich., a corporation of Michigan Application February 19, 1932, Serial No. 594,105

20 Claims. (Cl. 153—54)

This invention relates to tubing and has to do particularly with what is now commonly known in the trade as "Bundy" tubing, patented by H. W. Bundy, October 10, 1922, No. 1,431,368.

This tube may be made by drawing a strip of stock through forming rolls and then with continuous movement passing the same through one or more heated zones where the same may be sealed by the application of a relatively low melting point sealing metal. Such a metal may comprise an alloy of lead and tin, such as is commonly termed "solder". The movement of the strip through the tube forming rolls may be relatively fast, but it is feasible to seal the tube with such low point fusing metal notwithstanding this relatively fast movement.

Where, however, it is desirable to seal the tube with metal other than solder, such as that described above, the time element of the heating operation may be lengthened. The result is that a tube forming machine is capable of turning out tubing at a rate of speed much greater than the same can be sealed in the heat treatment. This is true where the sealing metal for the tubing is of a relatively high fusing point such as copper, copper alloys such as brazing metal, copper nickel alloy, copper silver alloy, or other metals.

Accordingly, for efficient operation it is desirable to make up the tube by a tube forming machine and maintain a supply of formed tubing unsealed, which may later be sealed in the slower sealing process involving the higher fusing point metals. In this manner a single tube forming machine may be capable of making enough tubing for keeping several sealing devices or furnaces busy subjecting the formed tubing to the sealing heat treatment. However, in order to do this, and to obtain a finished product of high character, it is desirable that the tube be of such a metal as to be self-sustaining in its formed shape before its parts are united by the sealing metal. The present invention therefore is directed towards the provision of such a tube which is self-sustaining prior to its having been sealed, and also to a machine and method for the production of such a tube.

In the accompanying drawings:

Figs. 1, 1A, and 1B are plan views of a tube forming machine designed for carrying out the invention and the different views of the machine for showing parts normally disposed in alignment.

Figs. 2 and 2A are side elevational views of the machine.

Figs. 3 to 21 inclusive, are sectional views illustrating the successive shapes of the strip as it may be formed into tubing, showing portions of the forming rolls as follows:

Figure 1:
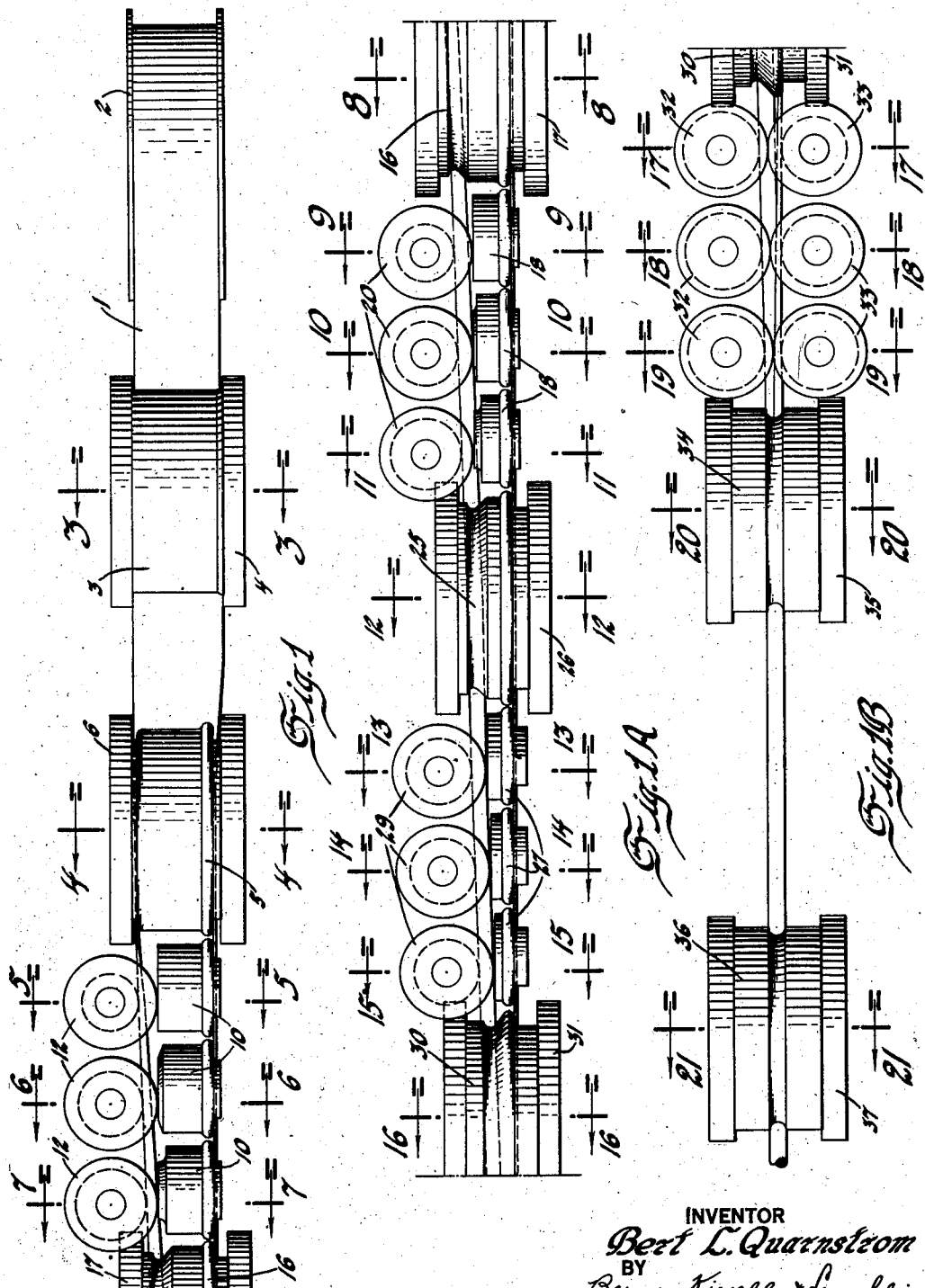
Figure 5:
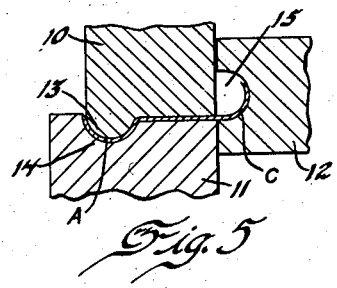
Figure 6:
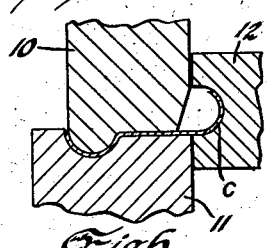
Figure 7:
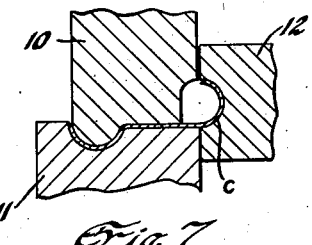

Figs. 5, 6 and 7 are sectional views taken through similar rollers as indicated by section lines 5, 6, and 7 of Fig. 1.

Figure 8:
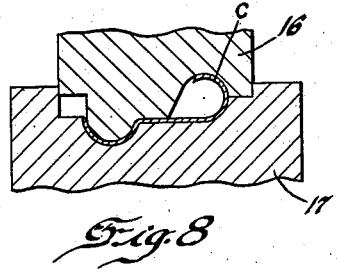

Fig. 8 is a sectional view taken on line 8—8 of Fig. 1A.

Figure 9:
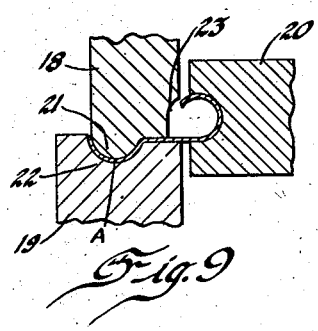
Figure 10:
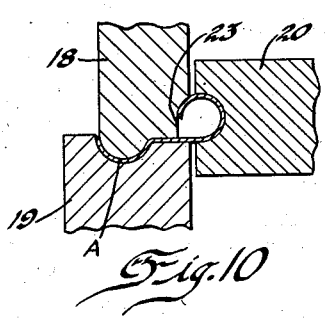
Figure 11:
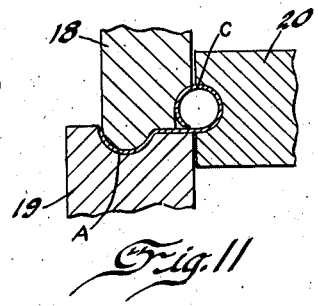

Figs. 9, 10 and 11 are sectional views taken through similar rollers on section lines 9, 10 and 11 of Fig. 1A.

Figure 12:
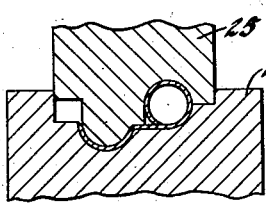

Fig. 12 is a sectional view taken substantially on line 12—12 of Fig. 1A.

Figure 13:
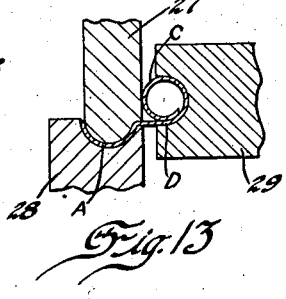
Figure 14:
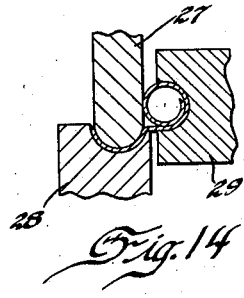
Figure 15:
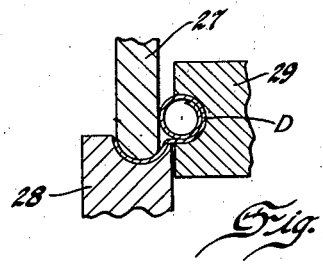

Figs. 13, 14 and 15 are sectional views taken through similar rollers on the corresponding sectional lines of Fig. 1A.

Figure 16:
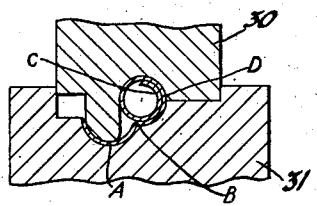

Fig. 16 is a sectional view taken on line 16—16 of Fig. 1A.

Figure 17:
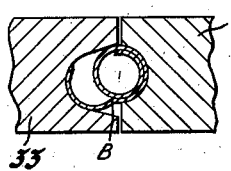
Figure 18:
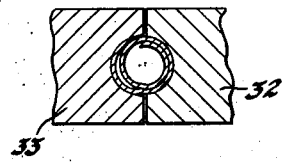
Figure 19:
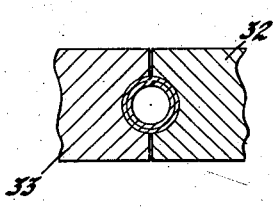

Figs. 17, 18 and 19 are sectional views taken through similar rollers on the corresponding section lines of Fig. 1B.

Figure 20:
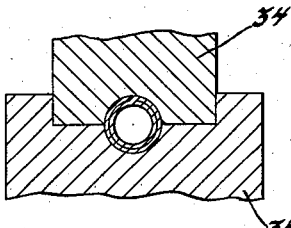

Fig. 20 is a sectional view taken on line 20—20 of Fig. 1B.

Figure 21:
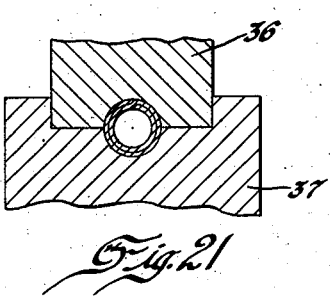

Fig. 21 is a sectional view taken on line 21—21 of Fig. 1B.

Figure 22:
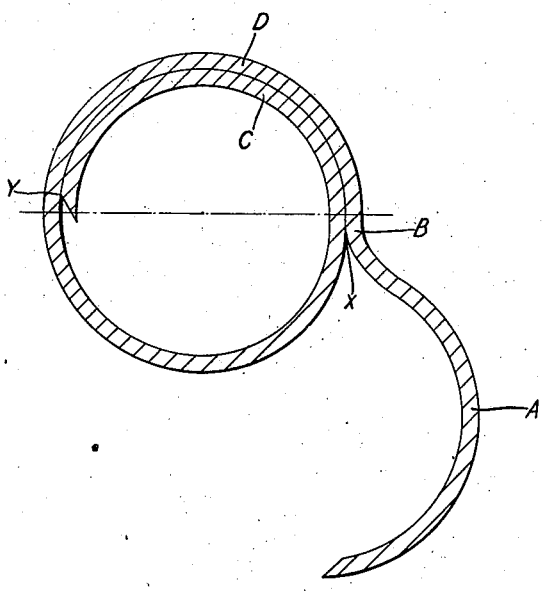

Fig. 22 is a sectional view of the enlarged form illustrating more clearly the formation of the tube in one step of its making.

Figure 23:
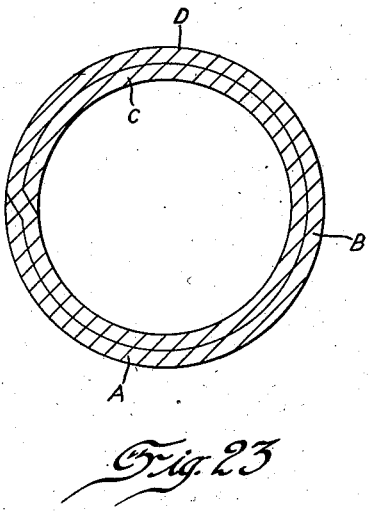

Fig. 23 is an enlarged sectional view of the finished tube.

Figure 3:
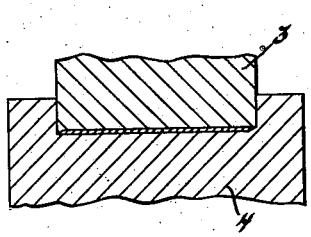
Fig. 3 is a sectional view taken through a pair of rollers, on line 3—3 of Fig. 1.
Figure 4:
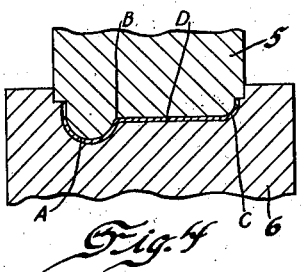
Fig. 4 is a sectional view taken on line 4—4 of Fig. 1.

The strip stock 1 may be drawn from a supply reel 2 through a pair of rollers 3 and 4 suitably shaped for beveling the edges of the strip as shown in Fig. 3. The strip may next be drawn through a pair of rollers 5 and 6 which, as shown in Fig. 4, places a curved formation along one edge of the strip as illustrated at A, and which may also place an initial curve on the opposite edge of the strip as shown. This curved section A is to ultimately become a portion of an outside ply of the tube. This curved edge of the stock preferably is held securely during most of the following formation of the tube. As will become apparent as the description progresses, the tube is formed primarily by rolling the strip transversely starting at the edge opposite the curved section A.

It will be noted that there is a bend line B (Fig. 4) joining the curved portion A and the body of the strip. For convenience in further describing the invention, the edge of the strip opposite the edge curved as at A, is identified by the character C with the intermediate portion between B and C identified by character D.

Figure 2:
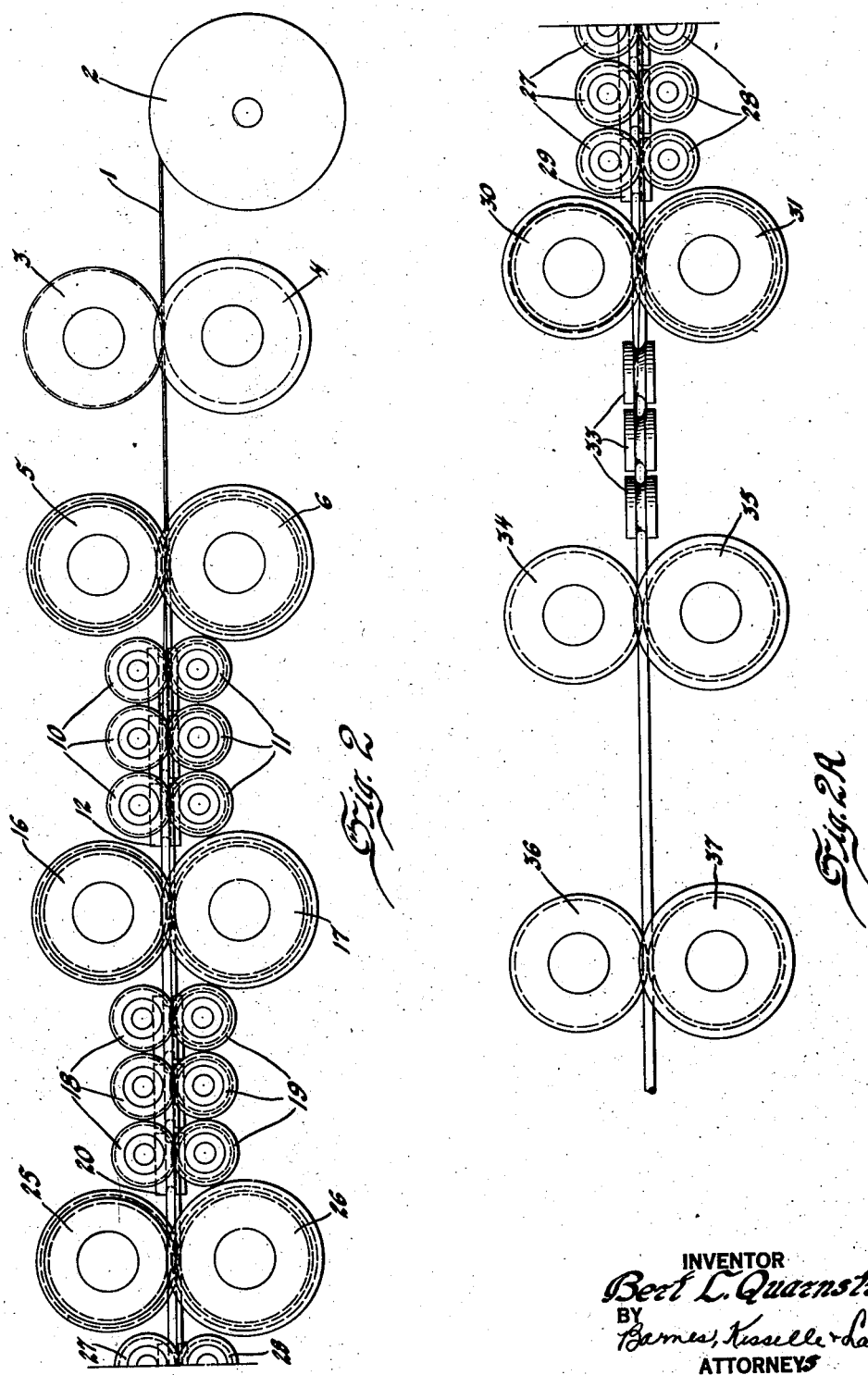

The strip may now be further fashioned by moving through a set of rollers, in which set there may be three units of three rollers each. Some of the rollers are opposed to each other, as shown in Fig. 2, three rollers 10 being above the strip and three opposing rollers 11 being below the strip. The terms "above" and "below" are descriptive and not limiting terms. Three other rollers 12 (Fig. 1) are preferably disposed on axes at right angles to the axes of rollers 10 and 11 and disposed to engage the edge C of the stock. The shape of these rollers may be seen by reference to Figs. 5, 6 and 7. The rollers 10 and 11 have cooperating formations such as a rib 13 on each of the rollers 10, and a cooperating recess 14 in each of the rollers 11. These formations grip the portion A and securely hold it. The three rollers 12 are grooved as at 15, and by reference to Figs. 5, 6 and 7 it will be noted that the three rollers progressively increase the curvature of the edge C of the strip.

Rollers 10, 11 and 12 may be idlers whereas larger rollers such as rollers 5 and 6 may be driving rollers. The strip may now pass through a pair of rollers 16 and 17; these may be driving rollers and are appropriately shaped, as shown in Fig. 8, for gripping the strip and they may also additionally curve the edge C. The strip may next pass through another set of rollers comprising three similar rollers 18, three opposing rollers 19 (Fig. 2) and three rollers 20 positioned at right angles thereto. All these rollers may be idlers. This set of rollers is similar to the set of rollers 10, 11 and 12, and they function in a similar manner. As shown in the cross sectional views (Figs. 9, 10 and 11) rollers 18 and 19 grip the stock, and particularly the portion A, as by projections 21 on the rollers 18, cooperating with the recess formation 22 on rollers 19. The rollers 20 successively increase the curvature in the portion C. As shown in Figs. 10 and 11 the edge C may be rolled against or into a cut-out portion 23 in the rollers 18.

The strip may now pass through another pair of rollers 25 and 26 which may be driving rollers and which, as shown in Fig. 12, are shaped to grip the stock and pass it lengthwise. The strip may now pass through other rollers which may be in a set and arranged similarly to the set of rollers 10, 11 and 12; this set comprising opposed rollers 27 and 28 and rollers 29 disposed on axes at right angles to the axes of the rollers 27 and 28. Referring to Figs. 13, 14 and 15, it will be noted that the rollers 27 and 28 grip the stock, particularly the portion A, and that the rollers 29 successively increase the rolling of the opposite edge to the extent that the portion C is rolled through more than 360° with the portion D starting to roll around the portion C. In fact, as shown in Fig. 15, the portion D has been wrapped around the inside portion C substantially to the extent of 180°. It will be noted that the axes of the rollers 12 and 20 may be all in alignment, but the grooves in these rollers successively become more shallow to take care of the decreasing thickness of the overall width of the strip of stock. The rollers 29, however, as particularly shown in Fig. 1, may be disposed on centers which progressively approach the strip of stock.

The strip of stock may now pass through a pair of rollers 30 and 31 which may be shaped in cross section, as shown in Fig. 16. A strip of stock is still gripped on the portion A and the part D at this point is wrapped around the part C, and the bend line B may be urged into contact with the underlying portion of the part C. These rollers also may be driving rollers. The particular formation of the tube at this time is of importance, and the same is shown somewhat diagrammatically in the enlarged view in Fig. 22. There is an important function of the parts as they are positioned, as shown in Fig. 2, as well as a function as the metal is worked to complete the tube. Before going into this, however, the description will proceed with the remaining steps and mechanism for completely forming the tube. As the strip passes through rollers 30 and 31, it may then pass through a set of rollers comprising three rollers 32, and three opposing rollers 33. The first pair of rollers grip the tube, as shown in Fig. 17, and start fashioning the portion A around the inner ply constituted by the part C, bending the metal at B. As shown in Fig. 18, the part A is further placed; as shown in Fig. 19, the tube is substantially completed, the rollers subjecting the same to some pressure causing the metal to be offset between the now adjacent extreme edges of the stock. The tube now is substantially in its completed form although it may be passed through other rollers which may be driving rollers 34 and 35, and 36 and 37 for advancing the tube and subjecting it to additional pressure for completely shaping the same. The tube now appears substantially as illustrated in Fig. 23, and is in its final shape except that the metal parts have not been secured together as by means of molten sealing metal or the like.

Revert now to Fig. 22 where it will be seen that a dot and dash has been drawn diametrically through the tube. The portion D fits around the part C to the bend B, more definitely identified by the point of contact X. This point, as Fig. 22 is viewed, lies below the center line. Accordingly, the part D laps over the part C between the point X and the extreme edge of part C more than 180°. In other words, there are more than 180° from the point X to the point Y. Thus the part D is locked around the part C so that in order to get the parts loose, the metal in the part D would necessarily have to be flexed outwardly in order to move its ends located at X and Y over the center line. The tube then in this form is self-sustaining and will not become unwrapped. As the part A is now fashioned into its final shape, the same is accomplished by bending the metal at B substantially on the fulcrum point at X, inasmuch as the curvature of the point A is already substantially that of its final form. This, in effect, constitutes a cold working of the metal in the bend B with the result that it is hardened and embrittled. When the part A is finally positioned it is sustained in this position by the aid of the embrittled metal in the bend B.

In other words, considering the finished tube structure, as shown in Fig. 23, the outer ply comprises parts D and A joining each other as at B. The portion D of the outer ply encircles the inner ply to an extent greater than 180° to the end that it is locked upon the inner ply. The part A is caused to hug the inner ply by reason of its having been preshaped into the requisite curvature, and by reason of the hardened metal at the point B, which by reason of its cold working is of increased stiffness serving to maintain the portion A of the outer ply into tight engagement with the underlying inner ply.

Tube thus formed may be made at a relatively high rate of speed, severed into desired lengths and more or less stored until it is to be finally finished by the heat treatment. The strip stock from which the tube is made may, for example, be initially provided with a covering or plating of copper or other metal, as above mentioned, and after it is formed into the tube, the same may be passed through a furnace of sufficient temperature to melt the copper, and wherein preferably, a reducing atmosphere is maintained. The tube may be handled and moved about and, in fact, may be more or less whipped or flexed in such handling after it is formed and prior to its having been sealed, yet the plies of the tube effectively remain in place without separation, or in other words, without unwinding. It might also be pointed out that the part D which holds itself upon the part C by the same token prevents the inner ply, constituted by part C, from unwinding or coming loose from within the part D.

While the invention is particularly adapted to the making of the so-called "Bundy" type of tube, which is to be handled and more or less stored between the forming operation and sealing operation, it is to be understood that the invention is not limited to such use as the present tube and method and machine for making it may be employed irrespective of when or whether the tube is finally sealed by molten metal. The tube in its finished form even without sealing by molten metal is capable of resisting considerable twisting torque and thus may be employed for some mechanical purposes without being sealed.

I claim:

1. The method of making multiple ply tubing from a single strip of stock which comprises moving the stock lengthwise, forming one edge of stock so that it is curved in cross section on a radius substantially that of an outer ply of the finished tube, rolling the strip from its opposite edge into a hollow cross sectional form, and then fashioning said curved edge around the hollow form to provide a part of the outer ply.

2. The method of making a tube from a single strip of stock which comprises passing a strip of stock lengthwise with substantially continuous movement, forming one edge thereof so that it is curved in cross section on a radius substantially that of an outer ply of the finished tube, rolling the strip transversely beginning at its opposite edge into hollow cross sectional form, holding the said curved edge of the stock during said rolling action, and then fitting the said curved edge around the previously rolled parts of the strip stock to complete the outer ply of the tube.

3. The method of making a tube of multiple ply walls from strip stock which comprises fashioning strip stock into an inner tubular ply, forming a reverse bend in the stock which is to form an outer ply, and placing the strip stock of the outer ply around the inner ply by bending the metal at the reverse bend.

4. The method of making a tube from strip stock having a wall with an inner ply and an outer ply which comprises, forming the inner ply from strip stock, fashioning strip stock of an outer ply partially around the inner ply with a reversely bent portion therein, and then fashioning the strip stock of the outer ply the rest of the way around the inner ply by bending the metal on the reversely bent portion.

5. The method of making a double ply wall tube from strip stock which comprises, fashioning a tubular inner ply from strip stock, placing a reverse bend in the strip stock of the outer ply, fashioning the metal of the strip stock for the outer ply on one side of the bend around the inner ply, and then fashioning the strip stock on the other side of the bend around the inner ply by bending the metal at the said reverse bend.

6. The method of making a double ply wall tube from strip stock which comprises, fashioning an inner ply from strip stock, placing a reverse bend in the strip stock for the outer ply lengthwise of the strip and located substantially centrally of the strip stock for the outer ply, shaping the strip for the outer ply, on one side of the bend, into substantially the curvature of the tube, fashioning the other side of the strip stock for the outer ply around the inner ply, and then bending the strip stock for the outer ply at the reverse bend for placing the said curved portion around the inner ply.

7. The method of making a double ply tube from a strip of stock which comprises, fashioning one edge of the strip so that it is curved in cross section with a bend line between the curved portion and the body of the strip, rolling the strip transversely from its opposite edge into substantially tube form, and then positioning the curved edge into abutting relation with the tubular form by bending the metal at the said bend line.

8. The method of making a double ply tube from a strip of stock which comprises fashioning one edge of the stock so that it is curved in cross section with a bend line between the curved portion and the body of the strip, rolling the body of the strip from the opposite edge into tube form with an inner ply and with substantially one-half an outer ply, then positioning the said curved edge against the inner ply by bending the metal on the said bend line.

9. The method of making a double ply tube from a strip of stock which comprises fashioning one edge of the stock so that it is curved in cross section with a bend line between the curved portion and the body of the strip, rolling the body of the strip from the opposite edge into tube form with an inner ply and with substantially one-half an outer ply, with the said one-half outer ply extending around the inner ply more than 180°, then positioning the said curved edge against the inner ply by bending the metal on the said bend line.

10. The method of making a double ply wall from strip stock which comprises forming one edge of the strip stock so that it is curved in cross section with a bend line between the curved portion and the body of the strip, rolling the body of the strip through slightly more than 540° into hollow cross sectional form, and then positioning the said curved portion around the hollow cross sectional form by bending the metal on the said bend line.

11. The method of forming a double ply tube from a strip of stock which comprises fashioning one edge of the stock so that it is curved in cross section with a bend line between the curved portion and body of the strip, fashioning the body of the strip into hollow cross sectional form with the interior thereof constituted by the face of the strip forming the concavity of the said curved portion, substantially abutting the bend line against the tubular form, and then positioning the curved portion around the tubular body by bending the metal on the said bend line.

12. In the art of making tube from strip stock, the steps of forming a bend in a strip of stock which is to form an outer ply of the tube reverse to that in which the strip is fashioned into a tube, shaping part of said strip around an inner tubular ply, and then positioning another part of said strip around the inner ply by bending the metal substantially at the said reverse bend, whereby to harden the metal at said reverse bend.

13. In the making of tube from a single strip of stock the method comprising, forming a bend in the strip intermediate its edges, which bend is reverse to the bend in the strip stock when formed into tube, curving the strip stock on one side of the bend, fashioning the stock on the other side of the bend into curved form, and then bringing the edges of the strip stock into close proximity by bending the metal on the said reverse bend with the bending action reverse to the bending action in forming the said reverse bend, whereby the metal at the reverse bend is hardened so that it is adapted to hold the strip stock into its tubular form.

14. In the method of making multiple ply tube from a single strip of stock, the steps of moving the strip with lengthwise movement, holding the strip along one edge as it moves to prevent transverse shifting of the strip, rolling the strip up from its other edge into hollow cross-sectional form having an inside diameter substantially that of the finished tube and then fashioning the edge which was previously held around said hollow form to complete the tube.

15. A method of making a tube of multiple ply walls from strip stock which comprises moving the strip stock lengthwise and while the stock is so moving, fashioning the strip stock into an inner tubular ply, forming a reverse bend in the stock which is to form an outer ply, and placing the strip stock of the outer ply around the inner ply by bending the metal at the reverse bend.

16. The method of making a tube from strip stock having a wall with an inner ply and an outer ply which comprises moving the strip stock with lengthwise movement, forming the inner ply from the strip stock, fashioning strip stock of an outer ply partially around the inner ply with a reversely bent portion therein and then fashioning the strip stock of the outer ply the rest of the way around the inner ply by bending the metal on the reversely bent portion.

17. An apparatus for making tube from strip stock which comprises means for moving the strip stock lengthwise, forming rollers for definitely fashioning one edge of the stock, a plurality of opposite rollers of less width than the width of the stock for engaging opposite sides of the said fashioned edge of the stock and holding the same, leaving the other edge free, a plurality of forming rollers for working the free edge of the stock into tubular form, and means for fashioning the said fashioned edge around the said tubular form.

18. An apparatus for making tubing with plural ply walls from strip metal stock comprising, means for moving strip stock lengthwise, a plurality of opposed rollers disposed lengthwise of the strip for engaging opposite sides of the strip, said opposed rollers arranged to leave one edge of the strip stock free and substantially progressively engaging less and less width of the stock, a plurality of forming rollers acting upon said free edge of the stock for shaping the same into tubular form substantially with progressive action which corresponds substantially to the decreasing width of engagement of the said opposed rollers, and means for fashioning the edge of the stock opposite the said free edge over the tubular form to complete an outer ply.

19. An apparatus for making tubing with plural ply walls from strip metal stock which comprises, means for moving the strip stock lengthwise, a plurality of opposed rollers disposed lengthwise of the strip for engaging opposite sides of the strip, said opposed rollers arranged to leave one edge of the stock free and substantially progressively engaging less and less width of the stock, a plurality of forming rollers having their axes disposed substantially at right angles to the plane of the strip stock for acting upon the said free edge of the stock for shaping the same into tubular form substantially with a progressive action corresponding substantially to the decreasing width of engagement of said opposed rollers, and means for fashioning the edge of the strip opposite the said free edge over the tubular form to complete an outer ply.

20. An apparatus for making tubing with plural ply walls from strip metal stock which comprises, means for moving the strip stock lengthwise, a plurality of opposed rollers disposed lengthwise of the strip for engaging opposite sides of the strip, said opposed rollers arranged to leave one edge of the stock free and substantially progressively engaging less and less width of the stock, a plurality of forming rollers for acting upon the said free edge of the stock for shaping the same into tubular form substantially with a progressive action corresponding substantially to the decreasing engagement of the said opposed rollers, means for fashioning the edge of the stock held between the opposed rollers into curved form substantially corresponding to the curvature of an outer ply of the tube to be formed, and means for fashioning this curved edge of the stock around the tubular form to complete an outer ply.

BERT L. QUARNSTROM.